May 31, 1927. 1,630,825
E. J. BOWMAN ET AL
DRILL ASSEMBLING UNIT
Filed March 9, 1926
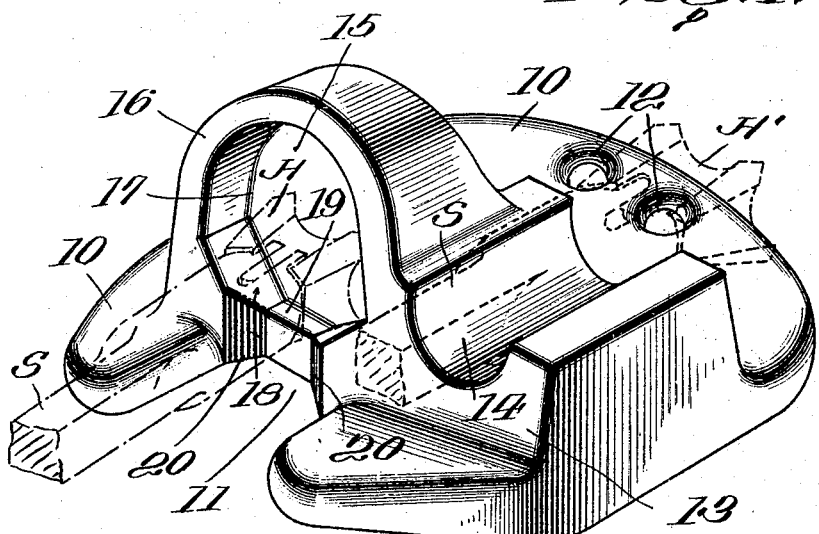
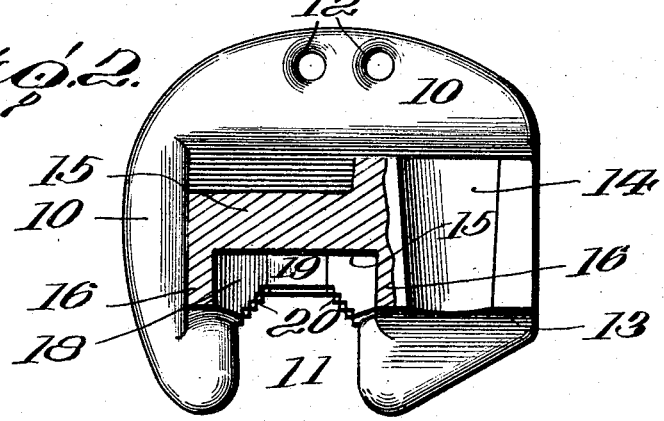
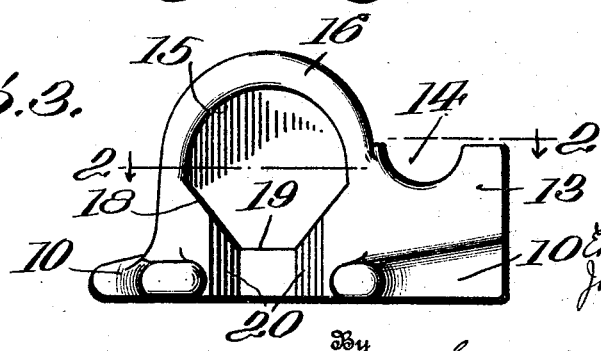
Inventor
Edward J. Bowman
John S. Nyhre
By
Sturtevant & Mason
Attorneys.

Patented May 31, 1927.

1,630,825

UNITED STATES PATENT OFFICE.

EDWARD J. BOWMAN, OF ANACONDA, AND JOHN S. MYHRE, OF BUTTE, MONTANA, ASSIGNORS TO HAWKSWORTH DRILL COMPANY, OF BUTTE, MONTANA, A CORPORATION OF DELAWARE.

DRILL-ASSEMBLING UNIT.

Application filed March 9, 1926. Serial No. 93,444.

This invention relates to improvements in anvils for assembling detachable drill heads upon their shanks, and more particularly to an integral knock-off and knock-on block for such purpose.

One of the objects of the present invention is a simply manufactured block which serves as an anvil during the placing and removing of detachable drill heads and shanks. A further object is to provide such a structure in which the drill head is prevented from flying after it has been separated from its shank, and thus becoming lost among local rubbish.

Another object is to provide such a structure of a compact and integral form, and which may be employed in mine or other localities where drilling is required, and which may be transported and fixed without especial difficulty.

On the accompanying drawing:

Figure 1 represents a perspective view of the block, with drill heads and shanks represented thereon in the respective positions for assembling and dismounting.

Fig. 2 is a section on line 2—2 of Fig. 3.

Fig. 3 is a front elevation.

According to this invention, a unitary block of cast iron, steel or other suitable metal, is prepared in a peculiar form for cooperation with a detachable drill head and its shank.

As described in Patent Nos. 1,511,201 and 1,511,466, drill shanks may have separable drill heads fastened thereto by a wedging web connection whereby the head and drill are locked during the operation of the drill in a mining machine.

It is, however, necessary that the drill head and the drill shank be separated from each other from time to time in order that the drill head may be sharpened, for example, on the machine represented in the copending application of Joseph F. Maickel, filed Jan. 14, 1926, Serial No. 81,221. For this purpose, it is customary to strike the shank in dismounting, while the drill head is supported upon a stationary beam. It is necessary to have a support for this purpose, and the impact and movement of the hammer upon the shank usually causes the drill head to fly to a distance and become lost among the rock fragments or the like on the mine floor. Further, a hammer blow upon the cutting edge will cause damage to the drill head. In replacing the drill head upon the shank, it is usually slipped loosely in place by hand, and then a blow is given upon it laterally to drive the members into a locked relative position.

The block employed for these purposes according to the present invention comprises a substantially flat base 10 having a cut-out portion 11 at the front end, and the holes 12 whereby the device may be spiked to a floor beam or rail tie if so desired. The device in its form is readily adapted to a firm support.

Upstanding from this flat base 10 is the knock-on block 13 which presents a frustoconical cavity 14. This block 13 is formed integrally with the base.

Likewise formed integrally with the base is the upwardly extending web wall 15 of the knock-on block, having a projecting flange 16 thereon to delimit a cavity 17. The bottom wall of the cavity 17 is formed by the inclined surfaces 18, and the narrow bottom surface 19. The cut-out section 11 extends with the vertical stepped walls 20 into relation with the inclined surfaces 18 so that the narrow bottom surface 19 is presented merely for the forward parts of the cutting edges of the drill head, and the shank is entirely free therefrom.

The drill head H and the drill shank S when in assembled position are placed with two of the four cutting edges resting firmly on the surface 19 and against the inclined surfaces 18, with the connecting tongue and socket of the head and shank respectively in a vertical plane (dot-and-dash lines in Fig. 1). A blow of a hammer upon the shank will force it downwardly and the head H will be stripped off and remain held within the walls 15 and 16 of the cup cavity 17. It is pointed out specifically that the impacting tool such as a hammer is prevented from striking upon the cutting edges of the drill head H during incautious blows either by accident or by reason of darkness at the point of work.

A new sharp drill head H' may then be placed upon the shank S by slipping it loosely into position with the fingers, and the shank presented in the cavity 14 (dash lines in Fig. 1). A slight blow with a hammer upon the rear portion of the drill head H' will drive it down into a position in which it is held firmly in place in the shank S.

It is obvious that the invention is not limited in essence to the particular illustration shown, but that it may be modified within the scope of the appended claims.

We claim:

1. A block for assembling and dismounting separable drills comprising a metal base plate, an integral metal arch formed with said plate and projecting therefrom, a closing wall at one end of said arch integral with said plate, said plate being cut away at the opposite end of said arch, and a projection on said plate forming in conjunction with one wall of said arch an open-ended groove, so that the head of a separable drill may be laid upon said base within said arch and the shank after detachment by a blow may move freely downward in said cut away portion, and so that a shank may be laid in said groove while a drill head is being driven thereonto.

2. A knock-off block for separable drills comprising a base plate with a portion of its upper surface formed to support the drill head free of the drill shank, and a retaining hood formed integrally with said plate and arching above the said surface, said flange serving to prevent flying of the drill head when the shank is detached therefrom by a hammer blow.

3. A knock-off block for separable drills comprising a metal plate with a portion of its upper surface formed to support the drill head free of the drill shank, and a retaining flange formed integrally with said plate and arched above said surface, means on said plate to aline said separable drill so that its head is beneath said flange, said flange forming a guard to prevent the impacting tool from striking the cutting edges of the drill head during hammering upon the drill shank to separate the same from the drill head.

4. A block for assembling and dismounting separable drills comprising a metal base plate, two parallel grooves formed on the upper surface of said base plate having a common projection on said base to form the separating wall therebetween, said projection being continued arcuately and merging into the other wall of one of said grooves to form a guard hood over one of the grooves, said guarded groove having an end closing wall and stop whereby said groove is adapted to support a drill head with the shank free of said guarded groove for separating the head and shank and to prevent flying of the head when detached, and whereby said other groove is adapted to support the shank free of the drill head to facilitate assembling of said shank and head.

In testimony whereof, we affix our signatures.

EDWARD J. BOWMAN.
JOHN S. MYHRE.